(12) United States Patent
Joseph et al.

(10) Patent No.: US 6,628,615 B1
(45) Date of Patent: Sep. 30, 2003

(54) TWO LEVEL VIRTUAL CHANNELS

(75) Inventors: Douglas J. Joseph, Danbury, CT (US); Maged M. Michael, Danbury, CT (US); Ashwini Nanda, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/484,745

(22) Filed: Jan. 18, 2000

(51) Int. Cl.$^7$ .......................... G06F 15/16; H04L 12/28
(52) U.S. Cl. ...................... 370/231; 370/252; 370/409; 709/230; 709/238
(58) Field of Search ................................ 370/251, 252, 370/229, 231, 235, 239, 352, 389, 397, 398, 399, 396, 400, 428, 409, 406; 710/56, 170, 305; 712/2, 11, 21, 29; 709/230, 238, 240, 244

(56) References Cited

U.S. PATENT DOCUMENTS 5,475,857 A * 12/1995 Dally ........................... 712/11
5,583,990 A * 12/1996 Birrittella et al. ............. 712/29
5,701,416 A * 12/1997 Thorson et al. ............. 370/351

OTHER PUBLICATIONS

Boura et al. "Efficient Fully Adaptive Wormhole Routing in n–dimennsional Meshes", IEEE, pp. 589–596 (1994).*
Yound et al. "Performance Evaluation of Multicast Wormhole Routing 2D–Torus Multicomputers", IEEE, pp. 173–178, (1992).*

* cited by examiner

*Primary Examiner*—Hassan Kizou
*Assistant Examiner*—Afsar M. Qureshi
(74) *Attorney, Agent, or Firm*—Scully, Scott, Murphy & Presser; Derek S. Jennings

(57) ABSTRACT

A system and method for communicating messages between nodes of a packet switched communications network, with each message having a defined message type and including message content. The system includes one or more second level channel interface devices connected with a first node for tracking information relating to bi-directional communication of packets over a communications channel established between the first and second network nodes; a device for receiving packets associated with messages from the first node and generating message flits associated with the messages for communication over the channel based on message content associated with the received message packets; a device for receiving message flits associated with messages communicated from a second node and received via the channel and generating corresponding message packet content for storage at the first node; and, one or more first level channel interface devices associated with one or more second level channel interface devices and interfaced to a network switch device at each first and second node for communicating flits to and from a respective first and second node via the channel, wherein the communications channel established between the first and second network nodes includes a first and second level channel selected according to the message content.

32 Claims, 7 Drawing Sheets

TWO LEVEL VIRTUAL CHANNELS

BACKGROUND OF THE INVENTION

1. Field of the Invention

This present invention relates generally to the field of network connected multiprocessor systems, and, more specifically, to a mechanism for improving the performance of data transmission through the network of such systems.

2. Discussion of the Prior Art

Network connected multiprocessor systems typically comprise nodes which communicate through a switching network. The nodes may be uni-processor workstations or bus based shared memory multiprocessor systems (SMP). A node may also be an I/O subsystem such a disk array which itself contains an I/O processor. In such systems, a variety of traffic may be communicated over the inter-connection network: shared memory coherence and data messages, TCP/IP packets, disk blocks, user level messaging, etc.. Each type of traffic relies on certain properties of the network to provide the type of service the producers and consumers of that traffic expect. In some cases latency is critical, such as with shared memory coherence traffic and with some types of user level messages. In other cases, throughput is more critical than latency, such as with disk accesses. In some cases, a quality of service guarantee in terms of latency or bandwidth is required. The challenge for the interconnection network in such systems is to provide appropriate characteristics for each data type. Except for the quality of service case, this typically involves balancing requirements of one data type against those of another. Various types of interconnection networks have been devised to address the general problem of providing good latency and throughput for a variety of traffic types. Most of these techniques have been developed in the context of packet switched (as opposed to circuit switched) networks. In these networks, the original message to be transmitted is decomposed into two smaller units. At one level, a message is broken into packets which may be fixed or variable in length. At the next level, packets are broken into fixed sized 'flits'. A flit is the fundamental data unit that can be interleaved at the lowest level of the network (i.e. the switching elements and the physical wires that connect them). The flit is also the level at which most techniques for enhancing network latency and throughput have been deployed.

The earliest packet switched networks were "store and forward" networks. In a store and forward network entire packets are passed from switching element to switching element. A subsequent packet is not transmitted until the entire packet in front of it completed transmission. A later enhancement to this basic approach was "wormhole routing". With wormhole routing the notion of a flit was introduced. Now, instead of waiting for an entire packet to be received into a switching element before forwarding, the first flits of the packet could be transmitted to a down stream switching element even before the later flits have been received from the up stream switching element. In this way, a packet could be stretched across the entire network through a 'wormhole route'. Wormhole routing significantly improves latency in lightly loaded networks, however it can severely degrade network throughput by blocking links that unrelated traffic could use, had not a wormhole route been in the way. A third type of network called "virtual cut-through" alleviated the blocking problem by providing enough buffering in the switching elements so that when a route is blocked an entire packet is guaranteed space so that it can be safely tucked entirely within the switching element. Of course, this guarantee comes at the expense of considerable space on the switching element, if it is to work efficiently.

A more recent development in packet switched networks for multi-processors is "virtual channels". Each physical channel, i.e., wire link between switching elements, is conceptually partitioned amongst multiple 'virtual' channels. Each virtual channel includes a physical virtual channel buffer on the switching element. The virtual channels are multiplexed across common physical channels, but otherwise operate independently. A blocked packet flit on one virtual channel does not block packet flits on a different virtual channel over a common physical channel.

Virtual channel networks provide better network utilization and reduce average communication latency by allowing data on one virtual channel (or lane) to overtake data on a different virtual channel when there is contention downstream on one channel but not on another. Another desirable property is guaranteed ordering of transmissions on each channel and the ability to prioritize different data types. One factor that mitigates the improvement in network utilization is fragmentation of bandwidth on network links due to underutilized network flits. This can occur when data types assigned to different virtual channels are smaller than the flit. If these data types are communicated frequently, but not frequently enough to allow multiple of them to be packed into a flit, the flits become under utilized which can result in network under-utilization. Furthermore, there is a motivation to make flits large to increase the payload to overhead ratio, which only exacerbates the problem. Also, if the flit size is optimized for communication of large objects such as IP packets, the network may not be suitable for communication of smaller objects such as cache lines.

It would be highly desirable to provide a network interface scheme that improves utilization in virtual channel networks and provides greater flexibility in how different data types are handled by the network.

SUMMARY OF THE INVENTION

It is an object of the invention to provide a network interface scheme that improves utilization in virtual channel networks and provides greater flexibility in how different data types are handled by the network.

According to the invention, there is provided a second level of virtual channels at the network interface, and particularly, the designation of many second level channels which may share a single first level channel on the network. First level channels operate within the network at the switch level and are only used for network decongestion. In general, virtual channels also provide prioritization of different types of communication, which capability can become essential when, for example, one data type blocking another leads to deadlocks. However, in the design of the invention, prioritization is handled by the second level channels which operate at the network interfaces, not at the switch level. The network switching elements are oblivious to the existence of second level channels.

Thus, the provision of a two level virtual channels network interface scheme decouples the issue of network congestion from the issue of how different types of communication are to be handled (with respect to the role of virtual channels in the network). The nodes of the system may be randomly assigned to a first level virtual channel and each node defines independently its own second level virtual channels. Alternatively, nodes may be assigned to virtual channels on the basis of how the system is partitioned, which reduces network interference between partitions. The number of second level channels and how they are managed may differ from node to node, as long as all the nodes that communicate with one another maintain a consistent policy amongst themselves. Each message type that a node recognizes is assigned to its own second level virtual channel. The network interface is responsible for packing the different message types from the second level channels onto its assigned first level channel. The ability to pack more than one message type on a single first level channel allows for more efficient use of network flits, which is how two level virtual channels can provide higher network utilization than single level virtual channels.

According to this scheme, three (3) message classes are supported by the mechanism: Latency Sensitive, Bandwidth Sensitive and Bi-Modal. Latency sensitive messages are messages of a size smaller than some M byte limit. Bi-Modal messages are those messages that comprise a latency sensitive component and a bandwidth sensitive component. The first N bytes of the message is considered latency sensitive and the remainder of the message is considered bandwidth sensitive. It is understood that both M and N are configurable through a trusted software agent. An application may specify a particular message class for any message that it sends, but the network interface hardware will reclassify a latency sensitive message to a bandwidth sensitive one if it is longer than M bytes. Furthermore, for a given flit of size L, the network interface hardware restricts M and N to be less than L (i.e., M<L; N<L). A latency sensitive message is further reclassified to bandwidth sensitive if M is greater than L (M>L).

Further according to this scheme, first level channels are divided into two (2) channel classes: Latency Sensitive and Bandwidth Sensitive. Within each class each first level channel is assigned a unique priority. Flits on higher priority first level channels overtake flits on lower priority channels. Second level channels provide a dedicated connection between two system nodes. The end points of a second level channel may or may not reside on different system nodes. When two end points are connected, a second level channel is formed and assigned a globally unique second level channel id. First level channels flow control flits at the link level. Second level channels flow control packets at the network interface level (i.e. end to end). The transport agent breaks messages into packets, if necessary, and passes them to the second level virtual channels specified by the agent above the transport level (e.g., Non-Uniform Memory Access "NUMA" controller, session layer of a TCP/IP stack, etc.). If a latency sensitive message has a length >M, the transport agent rejects the request and returns an error condition code. Second level channels split bi-modal messages into two parts. The first N bytes of the message are passed to a first level latency sensitive channel and the remainder is sent to a first level bandwidth sensitive channel nearest in priority.

Advantageously, the system of the invention achieves greater network utilization in systems that require fine grain communication such as coherence controllers or, in systems that do course grain communications such as TCP/IP.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENT

Figure 1:
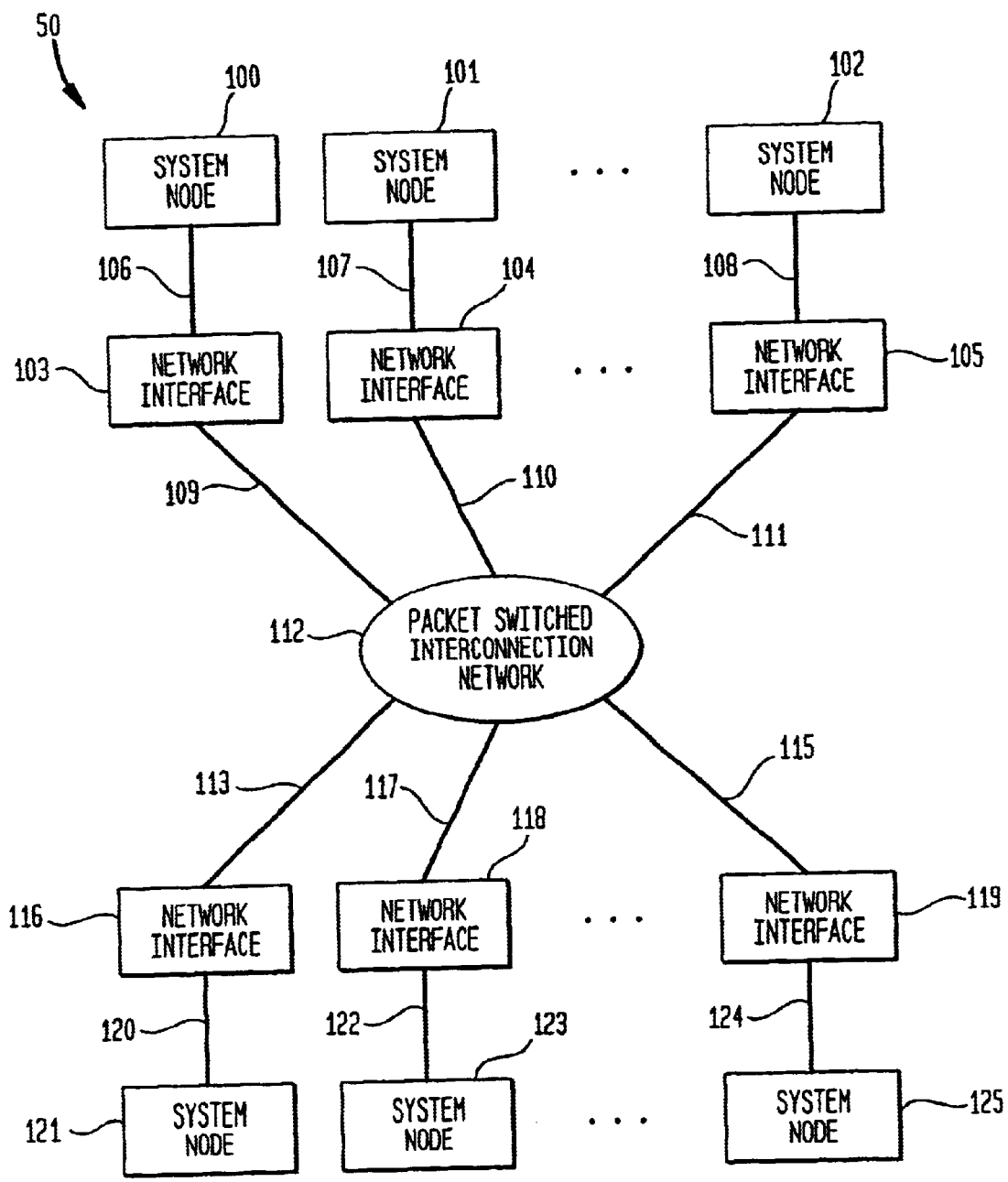
FIG. 1 illustrates a simplified schematic of a multiprocessor system composed of a collection of complete workstation or server nodes interconnected with a packet switched virtual channel network.

A typical system employing the two level virtual network interface scheme of the invention is illustrated in FIG. 1. FIG. 1 illustrates the system 50 comprising a plurality of commodity or semi-custom workstations or servers 100, 101, 102, 121, 123, 125 which communicate through a packet switched interconnection network 112 via respective network interfaces 103, 104, 105, 116, 118, 119 that reside between the system nodes and the interconnection network. The interconnection network 112 includes one or more stages of switching elements connected by high speed links (not shown). For the purpose of this invention, the switching elements are assumed to support a flit based wormhole or virtual cut through, virtual channel network. Particularly, each respective network interface 103, 104, 105, 116, 118, 119 implements the two level virtual channels of the invention which may be preferably implemented in hardware or in firmware residing on a co-processor included therein.

Figure 2:
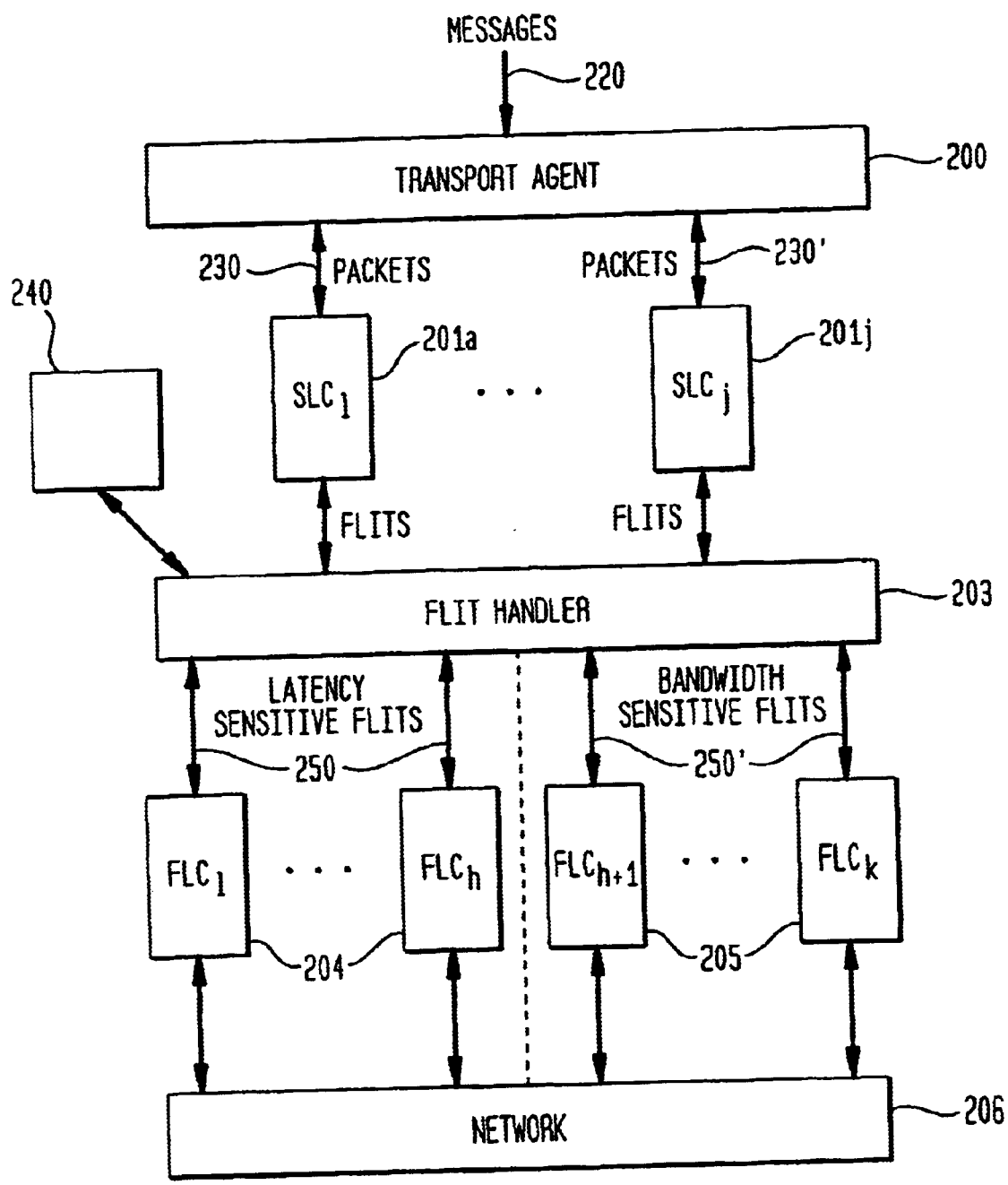
FIG. 2 illustrates the organization of a two level virtual channel network interface according to the invention.

FIG. 2 is a detailed block diagram illustrating the organization of a two level virtual channel network interface. As shown in FIG. 2, the highest level agent in the interface is the transport agent 200 which functions to accept requests to transfer messages, i.e., send and receive packets, between all users of the network interface. In general messages could have arbitrary structure, but for exemplary purposes, a message is assumed to comprise a request to transfer a copy of a contiguous region of memory 240 from one system node 100 to another over a particular second level virtual channel. Thus, a message is defined at the sending node 100 as including a "base address" of the contiguous region, the "size" of the contiguous region and a second level "channel id" on which the copy of information included at that region is to be sent. In addition, a "message class" and "priority" may also be specified. There are three message classes: latency sensitive, bandwidth sensitive and bi-modal. Latency sensitive messages are messages that must be smaller than a software configurable length "M," that is specified by a trusted software agent in a small message threshold register (not shown). Bi-modal class messages are messages that comprise two parts: a first user-specified part which includes the first "N" bytes of the message that are latency sensitive; and, a second remainder part of the message which is bandwidth sensitive. The transport agent 200 requires that N<=M. If a user specifies a latency sensitive message larger than M or a bi-modal message with a latency sensitive component >M, the transport agent 200 reclassifies the message as bandwidth sensitive. Additionally, the network interface prevents an M setting larger than the flit size L of the network.

It should be understood that the message class and priority specifications are optional and if no message class or priority is specified with a message, the transport agent assigns one. If the message size is <=M, it defaults to the latency sensitive message class. Otherwise, it is assigned to the bandwidth sensitive message class. In either case, the message is assigned the lowest priority in the respective message class.

Figure 7:
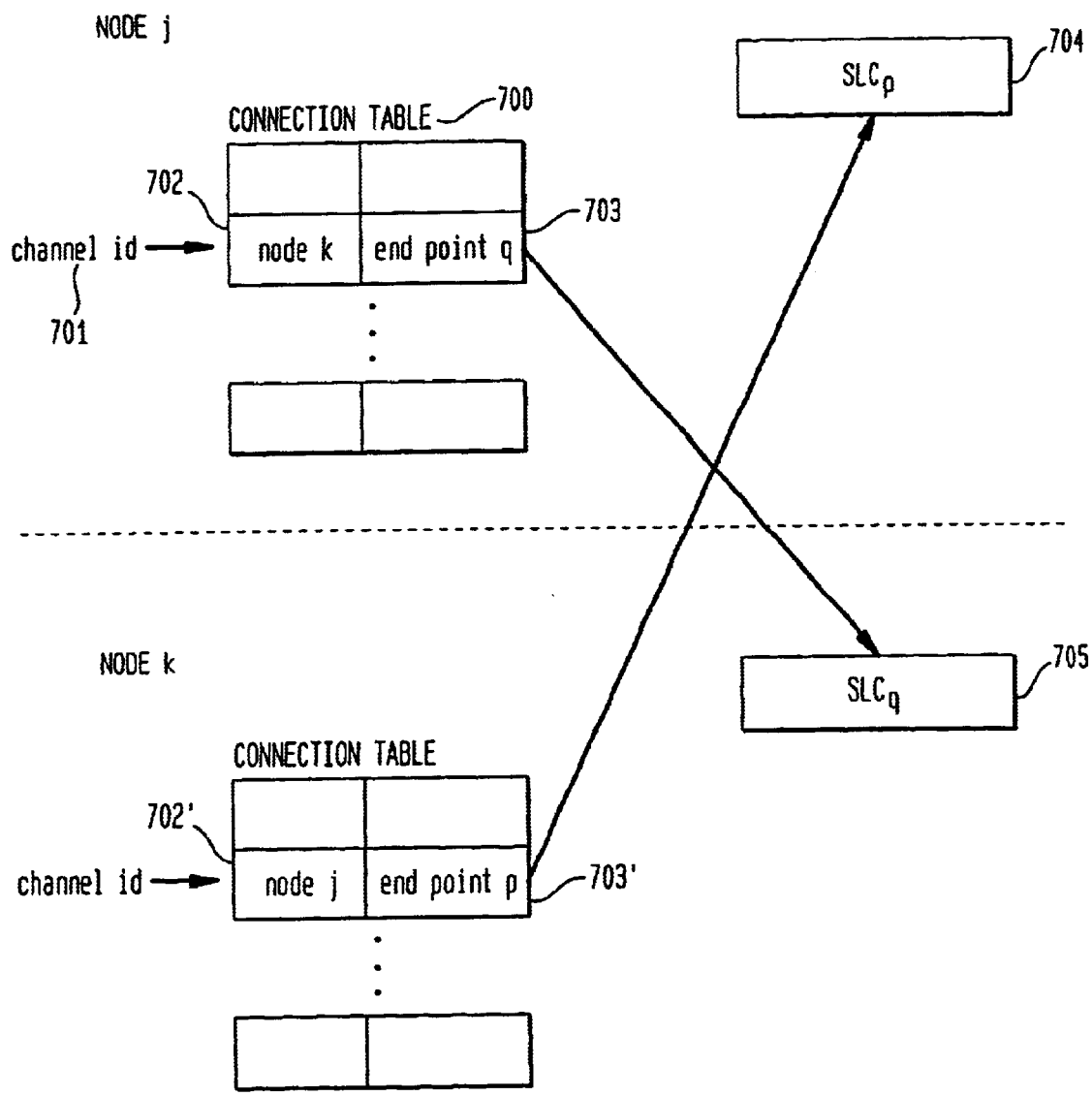
FIG. 7 illustrates how two second level end points form a connection.

After determining the class and priority of a message, the transport agent 200 parses it and forwards information about the message to the specified second level channel (SLC) indicated as SLCs 201a, . . . ,201j. If a bandwidth sensitive message is longer than the packet size of the network, the transport agent divides it into packets and passes information about each packet separately to the channel. Referring now to FIG. 7, every second level channel 201 includes exactly two end points 704, 705 in a system and is created by connecting an end point on one system node (e.g., node j) to an end point on the same system node or, another system node, (e.g., node k), as shown in FIG. 7. Once established, a second level channel provides a reliable bi-directional communication path between the two nodes. According to the invention, an end point is globally identified by a node id 702, 702' and an end point id 703, 703' as shown in FIG. 7. To connect two end points, users on the two nodes that wish to communicate submit a request to a trusted software agent 200 (FIG. 2), each specifying the remote node id and user id (e.g., process id) on the node they wish to establish communication with. The software agent matches the requests from the two users and allocates resources for the channel. The resources consist of an end point on each node 704, 705 and a second level channel id 701 that uniquely identifies the channel globally. The remote node id 702 and remote end point id 703 of the other end of the channel is recorded in a connection state table 700, 700' on each node, as shown in FIG. 7. The channel id can be either an index into the table or an associative lookup tag.

Figure 3:
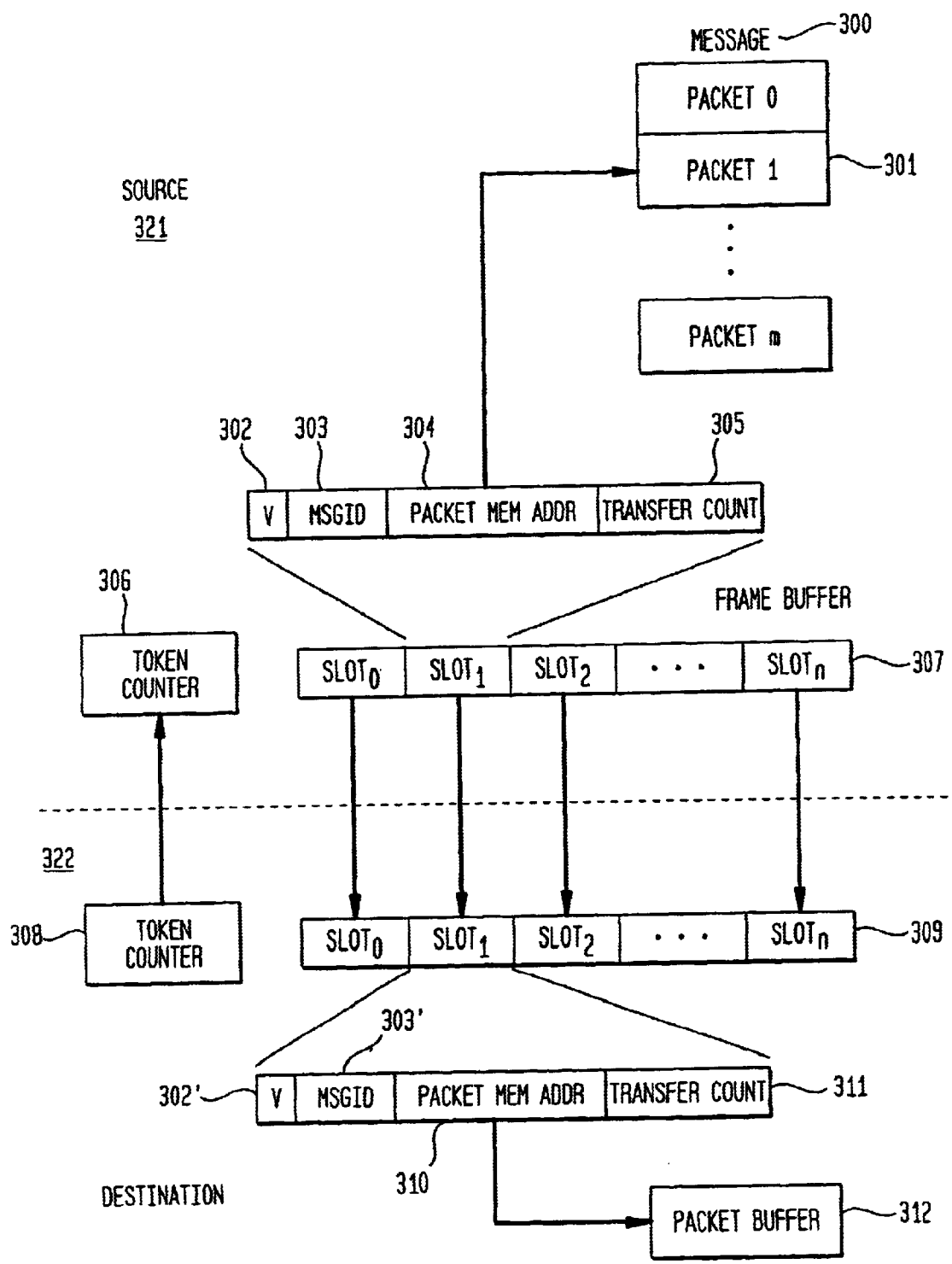
FIG. 3 illustrates the dataflow of a message through a two level virtual channel from the source node to the destination node, including frame buffers and flow control.

As further shown in FIG. 3, a second level channel 201 includes a frame buffer 307, 309 at both the source side 321 of the second level channel and at the destination side 322, respectively. The source side frame buffer 307 includes a number of slots, slots$_0$, . . . , slots$_n$ that are filled in the order in which the buffer receives packet transfer requests from the transport agent. Packets are sent to the destination node in that same order and if the ordering is lost in passing through the network (e.g., adaptive routing) the order is recovered in the destination side frame buffer 309. This is accomplished through the use of sequence numbers transmitted with each packet which number is simply the index of the frame buffer slot corresponding to the packet. It is understood that recovery of lost packets may also be facilitated using this sequence number and a timeout mechanism. As shown in FIG. 3, each frame buffer slot includes four (4) pieces of information about packets that are in transit across the network: 1) a send side slot including a valid bit 302; an identifier of the message (message id) from which the packet came 303; 3) the base address in memory of the packet payload to be sent 304; and, 4) a transfer count 305 that is initialized with the payload size of the packet and then decremented as packet flits are passed to the network. The memory address of the packet payload may reference an on-chip location, as in the case of a Non-Uniform Memory Access (NUMA) coherence controller which generates request and response transactions in a collection of FIFO's. In that example, the memory address is actually the FIFO's out pointer.

As further shown in FIG. 3, destination side slots of the destination frame buffer 309 each include the same four pieces of information. However, some of these have a slightly different meaning than on the source side. For instance, the valid bit 302' and message id 303' are the same with the message id being obtained from the first packet flit when it arrives at the destination node. Although packets may lose order in passage through the network, the flits associated with a given packet cannot. The packet memory address 310 at the destination side slot may point directly to the offset from the message base address in the case where the user posted the receive buffer prior to packet arrival. However, if the user process at the destination did not post a receive message buffer prior to arrival of the first packet flit, the transport agent would need to allocate a temporary packet buffer 312 and pass that to the second level channel instead. The transport agent would then copy the packet buffer to its final destination when the user process eventually posts the receive buffer. Thus, transfer count 311 in the destination side frame buffer 309 keeps track of the packet flits as they arrive on the network. The transfer count is initialized to zero and is incremented as packet flits arrive. The first packet flit includes the size of the packet, so that the second level channel can determine when all the flits have arrived.

FIG. 3 further illustrates a token counter flow control device including a source side token counter 306 and destination side token counter 308 with an amount of tokens corresponding to an amount of slots in each corresponding frame buffer 307, 309. The token counters 306, 308 of token counter flow control device particularly implement a token passing mechanism for indicating availability of free slots in each corresponding frame buffer when a slot is freed up, after a packet belonging to a message has been processed.

Whereas second level channels handle network packets end to end, first level channels handle packet flits link to link. Thus, FIG. 2 illustrates message requests 220 coming into the transport agent 200, packets 230, 230' being output from the transport agent 200 and input into the second level channels 201a, . . . , 201j, and, flits coming out of the second level channels for input into a flit handler device 203. As previously discussed, it is not actually packets that pass from the transport agent to the second level channels, rather information describing the packets. The frame buffers 307, 309 (FIG. 3) in the second level channel that hold this information are visible to the flit handler 203. As shown in FIG. 2, the flit handler 203 is interfaced between the second level and first level channels and memory 240. On the sending side, the flit handler 203 pulls packet payload data from the memory locations in memory 240 that is pointed to by the second level channels, for example, via frame buffers 307 shown in FIG. 3, and repackages it to the flit format. The flits 250, 250' are then forwarded to respective first level channel interface devices 204, 205, for storage in one or more flit staging buffers (not shown). The flit handler 203 itself may comprise a flit staging buffer as well, but preferably, the flits are composed in the first level channel flit buffers. On the receiving side, the flit handler pulls flits from the first level channel and recomposes them into packets for storage in the locations pointed to by the second level channels.

More particularly, on the sending side, the flit handler 203 determines which channel class the flit will go out on and selects either a latency sensitive channel 204 comprising one or more first level channel interfaces (FLC$_1$, . . . ,FLC$_h$) or a bandwidth sensitive channel 205 comprising one or more first level channel interfaces (FLC$_{h+1}$, . . . ,FLC$_k$) 205. On the receiving side, the particular first level channel on which a flit arrives determines what the flit handler 203 does with the flit.

Figure 4:
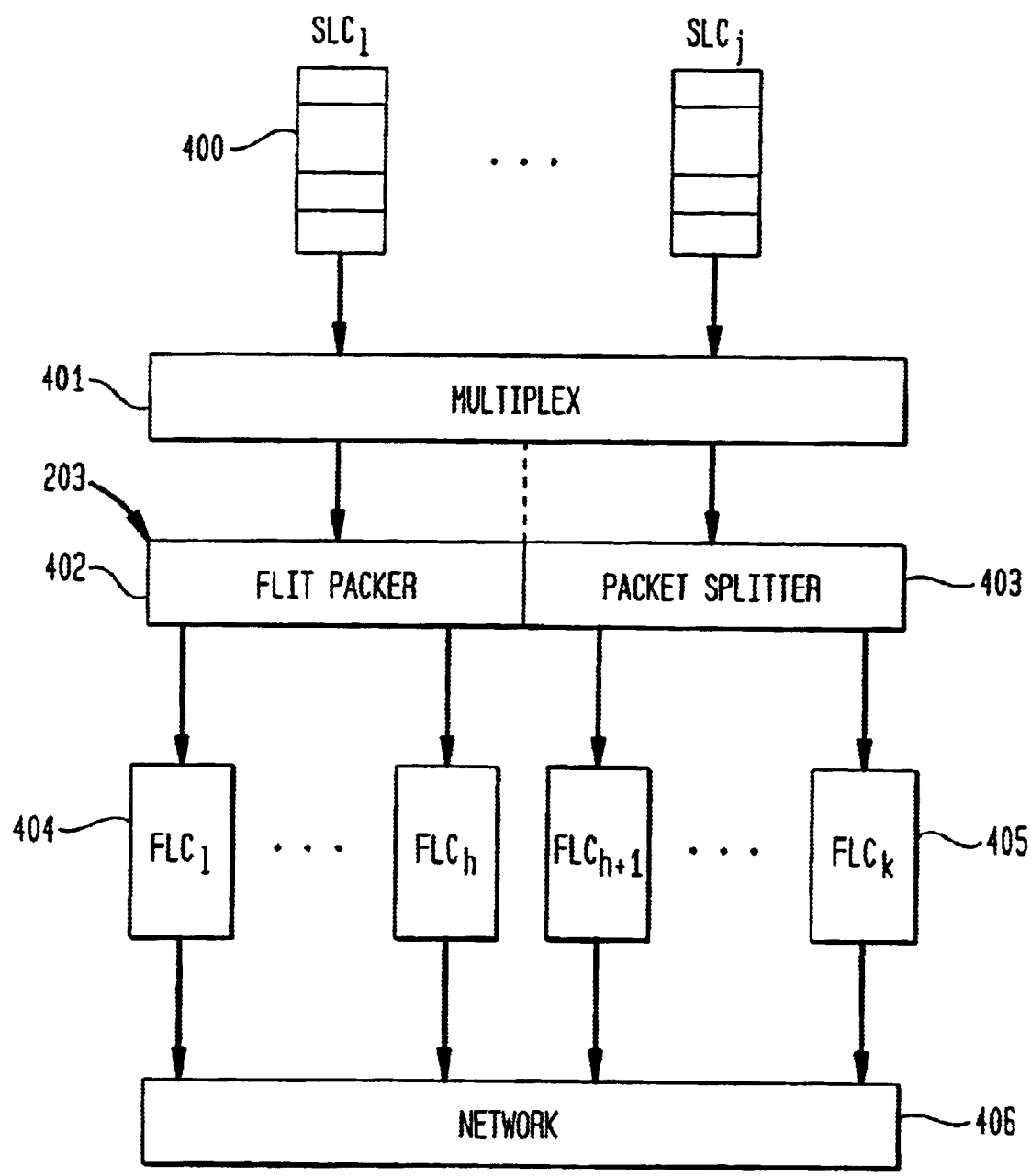
FIG. 4 illustrates the structure of the source side flit handler in a two level virtual channel system.

As shown in FIG. 4, the send side flit handler 203 is characterized as comprising two halves: 1) a flit packer portion 402 which composes latency sensitive flits from multiple latency sensitive messages and/or the leading part of bi-modal messages; and, 2) a packet splitter portion 403 which, as the name implies, breaks bandwidth sensitive message packets and/or the bandwidth sensitive part of bi-modal messages into bandwidth sensitive flits. Flits composed by the flit packer 402 are forwarded to a latency sensitive first level channel interface ($FLC_1, \ldots, FLC_h$) 404 for transmission on the network 406. Flits composed by the packet splitter are forwarded to a bandwidth sensitive first level channel interface ($FLC_{h+1}, \ldots, FLC_k$) 405. The first level channel to which a flit is routed is determined by the message priority from which the flit arose. In the case of latency sensitive flits, all the components packed into the flit come from messages with the same priority. In addition to formatting flits and routing them to the appropriate first level channel, the send side flit handler 203 makes a determination when to pull packet data from a second level channel for flit formatting. This determination is based on message priority. If while the flit handler is composing a flit of one priority a message packet of higher priority arrives on a different second level channel, the flit handler suspends formatting on that flit and switches to compose the new flit. The flit staging buffer in the first level channel of the suspended flit holds the partially composed flit while the flit handler is working on the new flit. Whenever flit composition is done for any given flit, the flit handler notifies a first level flit scheduler (not shown) of the first level channel that it has a flit ready for transmission on the network. Note that any one level virtual channel mechanism requires a scheduler to multiplex flits from the first level channels onto the network 406.

Figure 6:
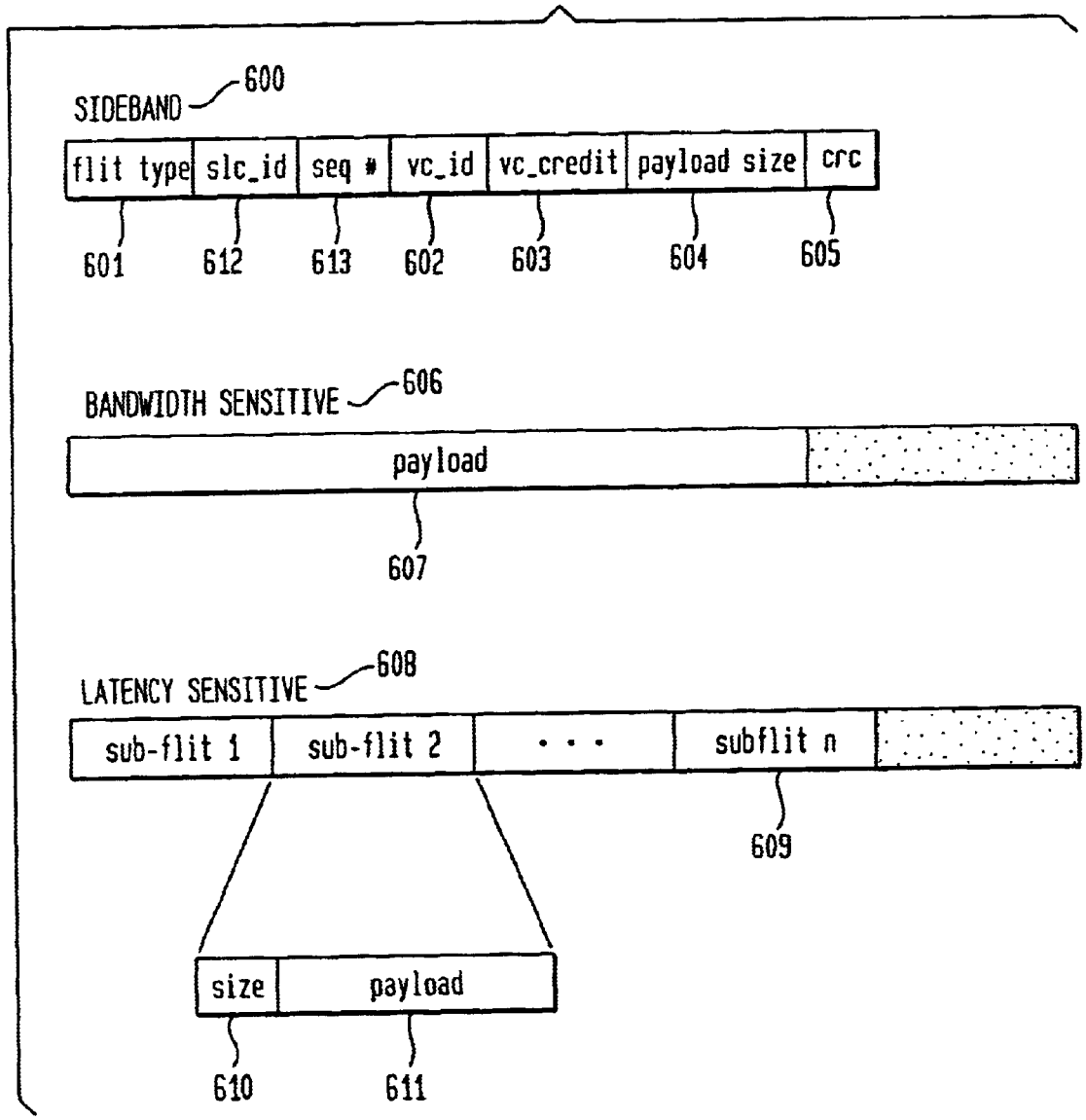
FIG. 6 illustrates the flit format of a two level virtual channel system.

Flits in a two level system have two forms: latency sensitive and bandwidth sensitive, as shown in FIG. 6. A flit consists of a sideband 600 and main path components which include a bandwidth sensitive component 606 and a latency sensitive component 608. In the common case of bi-directional links, the side band typically is carried on a separate wire that flows in the opposite direction of the main path. The side band carries information about the flit that is used to route, flow control and error recover the flit at the link level. FIG. 6 illustrates a side band 600 that includes typical sideband component information including a virtual channel id 602, flow control credit field 603, a flit payload size indicator 604, and, a cyclic redundancy code for error detection 605. According to the invention, the sideband contains three new additional component information for the two level system: a flit type indicator 601, a second level channel id 612, and a sequence number 613. The flit type indicator 601 is a single bit that distinguishes between latency sensitive and bandwidth sensitive flits. The second level channel id 612 indicates the second level channel the flit is to be directed to at the destination, and the sequence number 613 indicates the second level frame buffer slot 309 (FIG. 3) that the flit will be directed to at the destination. The main path of a bandwidth sensitive flit 606 contains a single payload 607 as indicated by the payload size indicator in the sideband. The main path of a latency sensitive flit 608 may contain multiple payloads or sub-flits 609. Each sub-flit consists of a separate size field 610 that indicates how large the payload of the sub-flit is, and the payload 611 of the sub-flit.

Figure 5:
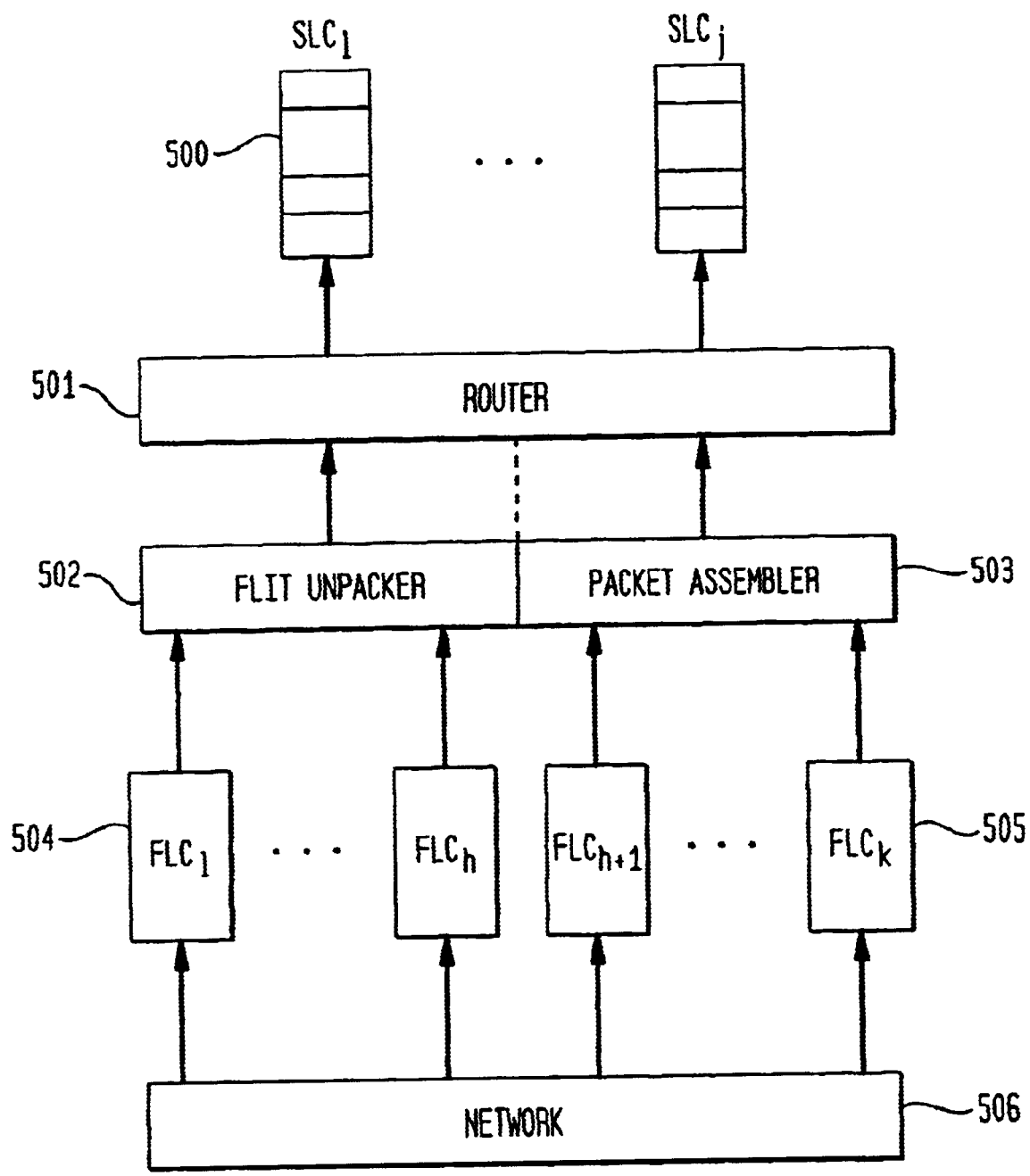
FIG. 5 illustrates the structure of the destination side flit handler in a two level virtual channel system.

It should be understood that the source side flit handler implements a packing algorithm for assembling flits for transmission over the network. One packing algorithm may be based on a simple first come first serve format, or it could provide a more adaptive optimization to minimize flit fragmentation. In many cases the size of the sub-flits is fixed at run time (e.g. NUMA controller request and response transactions), in which case the algorithm may be a simple static optimization. In other cases messages are variable at run time, in which case the algorithm may be more dynamic. The destination side flit handler, shown in FIG. 5, performs the opposite function of the send side flit handler. Instead of a flit packer there is a flit unpacker 502 which functions to parse latency sensitive flits and route 501 the sub-flit payloads to the second level channel designated in the sideband component 612 (FIG. 6). The second level channel 500 transfers the payload to the location indicated in the corresponding frame buffer slot 309 (FIG. 3). The destination side flit handler further comprises a packet assembler 503 which composes a packet from bandwidth sensitive flits for routing to the designated second level channel. The sequence number carried in the flit sideband component 613 indicates which frame buffer slot the flits will be directed to. The second level channels simply deposit flit or sub-flit payloads where the packet memory address in the frame buffer element 310 at the destination indicates. When the transfer count 311 decrements to zero, the second level channel notifies the transport agent that a complete packet has been received. The transport agent tracks the received packets and when all of them have arrived, it notifies the user.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A system for communicating messages between end points of a packet switched communications network, said system comprising:

first level flow control mechanism for handling communication of message data units across said network, one or more message data units comprising a message, said first level flow control mechanism including one or more first level channels for communicating said message data units to a network;

a second level mechanism above said first level mechanism for tracking communication of messages between end points of said network, said second level mechanism generating information in one or more second level channels for enabling generation of said message data units according to a message type, wherein message data units of different message types are communicated across a single first level channel to result in greater network utilization.

2. The system according to claim 1, wherein said second level mechanism further generates information for storage in one or more second level channels for enabling construction of messages from communicated message data units according to the message type.

3. The system according to claim 2, wherein said message type includes bandwidth sensitive message payload content.

4. The system according to claim 2, wherein said message type includes latency sensitive message payload content.

5. A two level virtual channel network interface for connecting nodes of a packet switched communications network, said interface comprising:

one or more second level channel interface devices each for tracking communication of messages over one or more communications channels established between two network nodes, said messages comprising message packets;

a message processing device for accepting requests to send or receive messages and defining a message in terms of corresponding message packet descriptions, said device forwarding said message packet descriptions to one or more second level channel interface devices for storage thereat according to a message type;

one or more first level channel interface devices associated with one or more second level channel interface devices and interfaced to a network switch device at each network node for communicating message packet flits associated with a message packet over a communications channel defined between a source and a destination node;

source side flit processing device for receiving said message packet descriptions from said second level channels at a source node and generating said message packet flits including message packet payload content based on said packet descriptions for communication over a first level channel interface device to a destination node, and destination side flit processing device for receiving transferred message packet flits, and assembling said flits into message packet payloads at said destination node in accordance with said message packet descriptions at a second level channel at said destination node, whereby tracking communication of different message types at a channel level between said network nodes and at a network switch level at said network nodes is enabled to result in greater network utilization.

6. The network interface as claimed in claim 5, wherein a message type includes one of: bandwidth sensitive messages and latency sensitive messages, said flit processing device including:

flit packer device for generating latency sensitive flits associated with said latency sensitive type messages; and, packet splitter device for generating respective bandwidth sensitive flits out of packets associated with bandwidth sensitive type messages, said respective bandwidth sensitive flits and latency sensitive flits being communicated over first level channel interface devices for communication over channels associated with respective message types to a destination node.

7. The network interface as claimed in claim 6, wherein said flit processing device further includes:

flit unpacker device for parsing latency sensitive flits and routing sub-flit payloads to designated second level channel interfaces; and, packet assembler device for generating packets from payloads of respective bandwidth sensitive flits, said respective bandwidth sensitive flits and latency sensitive flits being communicated over first level channel interface devices for communication over channels associated with respective message types to a destination node.

8. The network interface as claimed in claim 7, wherein each said flit comprises:

a sideband component for carrying information about said flit including a flit type identifier for distinguishing between latency sensitive and bandwidth sensitive flits, and, a second level channel interface device identifier indicating the second level channel that the flit is to be directed at said destination; and, a main component for carrying message packet payload associated with said message.

9. The network interface as claimed in claim 8, wherein a path component of a latency sensitive flit comprises one or more sub-flits each comprising a payload belonging to separate messages, and a size indicator indicating the size of a respective sub-flit payload.

10. The network interface as claimed in claim 9, further comprising counter device for incrementing a transfer count value at said destination side buffer according to a size of a flit packet payload received at said destination node.

11. The network interface as claimed in claim 8, wherein each said one or more second level channel interface devices includes a source side buffer having one or more slots, each slot associated with each packet to be transported across said interface and for storing said message content information associated with each packet, said message content information including:

i) a message id information for associating a packet with an originating message;

ii) a base address in an associated memory for indicating a location where the packet payload is to be communicated; and iii) transfer count information for tracking amount of packet payload transmitted across said network for a particular message, and initiated with a value of the total packet payload size for said message.

12. The network interface as claimed in claim 11, further comprising counter device for decrementing a transfer count value of said source side buffer according to a size of a flit packet payload transmitted across said network.

13. The network interface as claimed in claim 11, wherein each said one or more second level channel interface devices comprises a destination side buffer having one or more slots, each slot associated with each packet received at said interface and for storing said message content information associated with each packet arrived at a destination node, said message content information including:

i) said message id information received from a first packet flit arrived at said destination for associating an arrived packet with an originating message;

ii) a base address in an associated memory for indicating a location where the packet payload is to be deposited at said destination node; and, iii) transfer count information for tracking amount of packet payload received at said destination for a particular message.

14. The network interface as claimed in claim 13, wherein a flit sideband component further comprises a sequence number for indicating a second level buffer slot that a flit is to be directed to at said destination node.

15. The network interface as claimed in claim 13, wherein said second level channel interface device further comprises a flow control device for tracking amount of slots available in each said source side and destination side buffer.

16. The network interface as claimed in claim 13, further comprising table look-up device for maintaining channel connection states associated with available communications channels connecting an end point on one system node to an end point on another system node of said network, said message processing device further allocating communications channel resources based on said message content information and a channel connection state.

17. The network interface as claimed in claim 5, wherein a message type includes an associated priority, said flit processing device generating flits from message packets for communication over said network at times in accordance with the priority of said message received.

18. A method for communicating messages between nodes of a packet switched communications network, each said message having a defined message type and including message content, said method comprising the steps of:

receiving messages at a source network node and extracting message content information therefrom;

establishing a communications channel defined according to a message type between said source network node and a destination network node, said communication channel including an interface comprising a first level channel interface device for communicating message flits across a network switch device at each said source and destination nodes, a first level channel interface device having an associated second level channel interface device;

tracking message content of received and transmitted messages received at said second level channel interface device;

utilizing said message content information for generating flits comprising packet payload data and message content information according to a message type; and transmitting said generated flits over said established communications channel interface via said first level channel interface device, wherein said tracking of message content information at said second level channel interface device results in greater network utilization.

19. The method as claimed in claim 18, wherein a message type includes a latency sensitive message, said step of generating flits comprising the step of generating latency sensitive flits for transmission over latency sensitive communications channel.

20. The method as claimed in claim 19, wherein a message type includes a bandwidth sensitive message, said step of generating flits comprising the step of generating bandwidth sensitive flits out of packets associated with bandwidth sensitive type messages, for transmission over a bandwidth sensitive communications channel.

21. The method as claimed in claim 20, further including the steps of:

receiving bandwidth sensitive flits at a destination node; and, generating packets from payloads of respective bandwidth sensitive flits, said respective bandwidth sensitive flits and latency sensitive flits being communicated over first level channel interface devices for communication over channels associated with respective message types to a destination node.

22. The method as claimed in claim 20, wherein said generating step further including the steps of:

generating a sideband component for carrying information about said flit including: a flit type identifier for distinguishing between latency sensitive and bandwidth sensitive flits and, a second level channel interface device identifier indicating the second level channel that the flit is to be directed at said destination; and, generating a main component for carrying message packet payload associated with said message.

23. The method as claimed in claim 22, wherein a step of generating a main component for a latency sensitive flit includes the step packing one or more sub-flits each comprising a payload belonging to a separate message into said main path component, said one or more sub-flits each including a size indicator indicating the size of a respective sub-flit payload.

24. The method as claimed in claim 23, wherein said second level channel interface device comprises a source side buffer device having one or more slots, each slot associated with a unique packet transmitted to a destination node via said interface, the step of tracking message content information of transmitted messages further including updating said message content information for each packet communicated.

25. The method as claimed in claim 24, wherein said message content information includes transfer count value for tracking amount of packet payload communicated to a destination node for a particular message, said updating step including decrementing a transfer count value at said source side buffer according to a size of a flit packet payload communicated to said destination node.

26. The method as claimed in claim 24, wherein said second level channel interface device comprises a destination side buffer device having one or more slots, each slot associated with a unique packet received at a destination node via said interface, the step of tracking message content information of transmitted messages further including updating said message content information for each packet received.

27. The method as claimed in claim 26, wherein said message content information includes transfer count value for tracking amount of packet payload received at a destination node for a particular message, said updating step including incrementing a transfer count value at said destination side buffer according to a size of a flit packet payload received at said destination node.

28. The method as claimed in claim 26, further including the step of tracking amount of slots available in each said source side and destination side buffer.

29. The method as claimed in claim 26, further including the step of maintaining connection states associated with available communications channels connecting an end point on one system node to an end point on another system node of said network, said step of receiving messages and forwarding message content information further including the step of allocating communications channel resources based on said message content information and a channel connection state.

30. The method as claimed in claim 24, wherein a flit sideband component further comprises a sequence number for indicating a second level channel interface destination buffer slot that a flit is to be directed to at said destination node.

31. The method as claimed in claim 19, further including the steps of:

receiving latency sensitive flits at a destination node;

parsing said latency sensitive flits into one or more sub-flit payloads; and routing each sub-flit payload to designated second level channel interfaces.

32. The method as claimed in claim 18, wherein a message type includes an associated priority, said flit generating step occurring at times in accordance with the priority of said message received.

* * * * *